US007950173B2

(12) United States Patent
Jedlicka

(10) Patent No.: US 7,950,173 B2

(45) Date of Patent: May 31, 2011

(54) PORTABLE INFORMATION SIGN DEVICE

(75) Inventor: Maya P. Jedlicka, Plano, TX (US)

(73) Assignee: DBK Holdings, LLC, Dallas, TX (US)

( * ) Notice: Subject to any disclaimer, the term of this patent is extended or adjusted under 35 U.S.C. 154(b) by 281 days.

(21) Appl. No.: 12/151,705

(22) Filed: May 8, 2008

(65) Prior Publication Data

US 2008/0244947 A1 Oct. 9, 2008

Related U.S. Application Data

(63) Continuation-in-part of application No. 11/087,145, filed on Mar. 23, 2005, now Pat. No. 7,392,610.

(51) Int. Cl.

| | |
|---|---|
| ***G09F 15/00*** | (2006.01) |
| ***A45B 19/06*** | (2006.01) |
| ***E04H 15/40*** | (2006.01) |
| ***E04H 15/36*** | (2006.01) |
| ***E04H 15/44*** | (2006.01) |
| ***E04H 15/48*** | (2006.01) |
| ***F16M 11/38*** | (2006.01) |
| ***F16M 11/20*** | (2006.01) |
| ***A47B 91/00*** | (2006.01) |

(52) U.S. Cl. ......... 40/610; 116/63 P; 116/173; 135/125; 135/26; 135/135; 135/147; 135/136; 135/128; 248/170; 248/171; 248/188.6; 248/188.7; 248/567

(58) Field of Classification Search .................... 40/610; 135/128, 125, 26, 135, 147, 136; 248/170, 248/171, 188.6, 188.7, 597; 116/63 P, 173
See application file for complete search history.

(56) References Cited

U.S. PATENT DOCUMENTS

| | | | | |
|---|---|---|---|---|
| 2,090,783 | A | 8/1937 | Chinn | |
| 3,200,786 | A | 8/1965 | Swezy et al. | |
| D216,843 | S | 3/1970 | Lew | |
| 3,777,428 | A | 12/1973 | Caufield | |
| 4,256,050 | A | 3/1981 | Barnard | |
| 4,426,801 | A | 1/1984 | Gates | |
| D273,095 | S | 3/1984 | Schulze | |
| 4,462,145 | A | 7/1984 | Schulze | |
| 4,705,251 | A | 11/1987 | Samuelsson | |
| 4,815,784 | A | 3/1989 | Zheng | |
| 5,038,812 | A | 8/1991 | Norman | |
| 5,115,343 | A | 5/1992 | Bennett | |
| D329,016 | S | 9/1992 | Scarpa | |
| 5,199,375 | A * | 4/1993 | Johson | 116/209 |
| 5,213,147 | A | 5/1993 | Zheng | |
| 5,225,254 | A | 7/1993 | Foulke | |

(Continued)

FOREIGN PATENT DOCUMENTS

GB 1 395 169 5/1975

*Primary Examiner* — Joanne Silbermann
*Assistant Examiner* — Syed A Islam
(74) *Attorney, Agent, or Firm* — Kirby B. Drake; Klemchuk Kubasta LLP

(57) ABSTRACT

A portable sign including three legs movable between deployed and collapsed positions and a flexible covering bearing text, graphics or both includes a biasing mechanism urging the legs toward the deployed position. A support within the biasing mechanism secures three springs with the coils facing outward, one extension from each spring embedded in an upper support member and another extension movable within a plane tangential to a periphery of a lower support member and received by a hollow portion of one of the legs.

3 Claims, 3 Drawing Sheets

U.S. PATENT DOCUMENTS

| | | | |
|---|---|---|---|
| 5,301,705 A | 4/1994 | Zheng | |
| 5,358,440 A | 10/1994 | Zheng | |
| 5,452,934 A | 9/1995 | Zheng | |
| 5,467,794 A | 11/1995 | Zheng | |
| 5,560,385 A | 10/1996 | Zheng | |
| D375,421 S | 11/1996 | Weiner | |
| 5,579,799 A | 12/1996 | Zheng | |
| 5,618,246 A | 4/1997 | Zheng | |
| D381,051 S | 7/1997 | Zheng | |
| 5,664,596 A | 9/1997 | Zheng | |
| D390,897 S | 2/1998 | Wade | |
| 5,722,446 A | 3/1998 | Zheng | |
| 5,778,915 A | 7/1998 | Zheng | |
| 5,816,279 A | 10/1998 | Zheng | |
| 5,816,954 A | 10/1998 | Zheng | |
| 5,845,697 A | 12/1998 | Zheng | |
| 5,860,237 A | 1/1999 | Johnson | |
| 5,901,926 A | 5/1999 | Zheng | |
| 5,941,265 A | 8/1999 | Zheng | |
| 5,950,969 A | 9/1999 | Bennett | |
| 5,975,101 A | 11/1999 | Zheng | |
| 6,006,772 A | 12/1999 | Zheng | |
| 6,030,300 A | 2/2000 | Zheng | |
| 6,032,685 A | 3/2000 | Zheng | |
| 6,045,093 A | 4/2000 | Zheng | |
| 6,073,283 A | 6/2000 | Zheng | |
| 6,073,643 A | 6/2000 | Zheng | |
| 6,082,386 A | 7/2000 | Zheng | |
| 6,092,544 A | 7/2000 | Zheng | |
| 6,098,349 A | 8/2000 | Zheng | |
| 6,119,621 A | 9/2000 | Johnson | |
| 6,138,701 A | 10/2000 | Zheng | |
| 6,155,281 A | 12/2000 | Zheng | |
| 6,178,978 B1 * | 1/2001 | Rieber | 135/96 |
| 6,192,635 B1 | 2/2001 | Zheng | |
| 6,209,557 B1 | 4/2001 | Zheng | |
| 6,220,265 B1 | 4/2001 | Zheng | |
| 6,243,958 B1 | 6/2001 | Ringley, Jr. | |
| 6,264,573 B1 | 7/2001 | Zheng | |
| 6,266,904 B1 | 7/2001 | Zheng | |
| 6,267,128 B1 | 7/2001 | Zheng | |
| 6,267,129 B1 | 7/2001 | Zheng | |
| 6,269,826 B1 | 8/2001 | Zheng | |
| 6,273,368 B1 | 8/2001 | Zheng | |
| 6,289,910 B1 | 9/2001 | Zheng | |
| 6,305,396 B1 | 10/2001 | Zheng | |
| 6,318,394 B1 | 11/2001 | Zheng | |
| 6,325,086 B1 | 12/2001 | Shinner et al. | |
| 6,357,510 B1 | 3/2002 | Zheng | |
| 6,360,760 B1 | 3/2002 | Louie et al. | |
| 6,360,761 B1 | 3/2002 | Zheng | |
| 6,390,111 B2 | 5/2002 | Zheng | |
| 6,408,461 B2 | 6/2002 | Zheng | |
| 6,449,147 B2 | 9/2002 | Zheng | |
| 6,450,464 B1 | 9/2002 | Thomas | |
| 6,453,923 B2 | 9/2002 | Zheng | |
| 6,460,556 B2 | 10/2002 | Zheng | |
| 6,461,257 B2 | 10/2002 | Zheng | |
| 6,481,451 B1 | 11/2002 | Zheng | |
| 6,491,052 B1 | 12/2002 | Zheng | |
| 6,494,224 B2 | 12/2002 | Zheng | |
| 6,499,498 B1 | 12/2002 | Zheng | |
| 6,560,095 B1 | 5/2003 | Zheng | |
| 6,571,410 B2 | 6/2003 | Zheng | |
| 6,575,185 B2 | 6/2003 | Zheng | |
| 6,581,313 B1 | 6/2003 | Zheng | |
| 6,604,537 B2 | 8/2003 | Zheng | |
| 6,668,847 B2 | 12/2003 | Zheng | |
| 6,684,894 B2 | 2/2004 | Zheng | |
| 6,694,994 B1 | 2/2004 | Zheng | |
| 6,698,441 B1 | 3/2004 | Zheng | |
| 6,705,338 B2 | 3/2004 | Zheng | |
| 6,714,407 B2 | 3/2004 | Zheng | |
| 6,736,152 B2 | 5/2004 | Zheng | |
| 6,736,740 B2 | 5/2004 | Zheng | |
| 6,752,163 B2 | 6/2004 | Zheng | |
| 6,758,003 B2 | 7/2004 | Zheng | |
| 6,766,815 B2 | 7/2004 | Zheng | |
| 6,848,460 B2 | 2/2005 | Zheng | |
| 6,851,439 B2 | 2/2005 | Zheng | |
| 6,856,504 B2 | 2/2005 | Zheng | |
| 6,881,114 B2 | 4/2005 | Zheng | |
| 6,901,940 B2 | 6/2005 | Zheng | |
| 6,908,353 B2 | 6/2005 | Zheng | |
| 6,926,020 B2 | 8/2005 | Zheng | |
| 6,928,951 B2 | 8/2005 | Huang | |
| 7,031,147 B2 | 4/2006 | Zheng | |
| 7,047,681 B2 * | 5/2006 | Perelli et al. | 40/610 |
| 7,048,654 B2 | 5/2006 | Zheng | |
| 7,073,523 B2 | 7/2006 | Zheng | |
| 7,080,653 B2 | 7/2006 | Zheng | |

* cited by examiner

PORTABLE INFORMATION SIGN DEVICE

CROSS-REFERENCE TO RELATED APPLICATIONS

The present application claims priority as a continuation-in-part to U.S. patent application Ser. No. 11/087,145 filed on Mar. 23, 2005 now U.S. Pat. No. 7,392,610 and entitled "PORTABLE INFORMATION SIGNE DEVICE." The content of the above-identified patent documents is hereby incorporated by reference.

TECHNICAL FIELD

The present disclosure is directed, in general, to self-standing portable structures and, more specifically, to collapsible self-standing portable structures serving as warning markers and the like.

BACKGROUND

Collapsible or folding portable structures for cautionary, warning or alert purposes have been employed or proposed wherein a plurality of substantially rigid legs are hingedly connected at one end and biased to expand the opposite ends away from each other. Examples include U.S. Pat. No. 5,199,375 and U.S. patent application Publication No. 2006/0225319. The legs of such structures are generally covered with a flexible material such as canvas, plastic or fabric, which bears a warning message. In a deployed position, the structure rests on the ends of the legs that have been expanded away from each other, forming a pyramidal structure.

The biasing means within such structures is unsatisfactory. In U.S. Pat. No. 5,199,375, for example, torsional coil springs have ends each inserted into the ends of the tubular stays or legs, with the ends of two different springs being received by each leg and each spring having an end inserted in two adjacent legs. Such a biasing scheme suffers from the potential for an end of one or more springs to become dislodged from the leg into which that spring end was inserted, by coming out of the leg's end longitudinally, by the material of the tubular leg splitting, or as a result of some other circumstance. The different forces placed on the tubular leg by springs urging the leg in different directions may, for example, induce material fatigue and splitting of the leg at the end in which the spring ends are inserted. In such situations, an imbalance arises in the biasing and the structure may not deploy properly. In addition, failure of one of the springs may result in the biasing forces of the remaining two springs to cause the structure to deploy incorrectly.

The device disclosed in U.S. Patent Application Publication No. 2006/0225319 utilizes a biasing spring moving a spreader mechanism along a central rod, and is thus complicated and more expensive to manufacture and involves more parts that may malfunction. Thus, the existing biasing mechanisms for self-standing portable structures used to provide information, such warnings, advertisements, and/or general content, have not been successful in providing a simple structure that is inexpensive to manufacture, compact for storage and transportation, lightweight and easy to carry, quick and easy to erect, and quick and easy to collapse.

There is, therefore, a need in the art for an improved portable information sign device.

SUMMARY

To address the above-discussed deficiencies of the prior art, it is a primary object of the present disclosure to provide, for use in providing a portable information sign device employed to display an alert or warning message, an improved biasing mechanism. A portable sign including three legs movable between deployed and collapsed positions and a flexible covering bearing text, graphics or both includes a biasing mechanism urging the legs toward the deployed position. A support within the biasing mechanism secures three springs with the coils facing outward, one extension from each spring embedded in an upper support member and another extension movable within a plane tangential to a periphery of a lower support member and received by a hollow portion of one of the legs.

The foregoing has outlined rather broadly the features and technical advantages of the present disclosure so that those skilled in the art may better understand the detailed description that follows. Additional features and advantages will be described hereinafter that form the subject of the claims. Those skilled in the art will appreciate that they may readily use the conception and the specific embodiment disclosed as a basis for modifying or designing other structures for carrying out the same purposes. Those skilled in the art will also realize that such equivalent constructions do not depart from the spirit and scope of this disclosure in its broadest form.

Before undertaking the detailed description below, it may be advantageous to set forth definitions of certain words or phrases used throughout this patent document: the terms "include" and "comprise," as well as derivatives thereof, mean inclusion without limitation; the term "or" is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present invention in this patent document are by way of illustration only and should not be construed in any way to limit the scope of the disclosure. Those skilled in the art will understand that the principles of the present invention may be implemented in any suitably arranged device.

Figure 1:
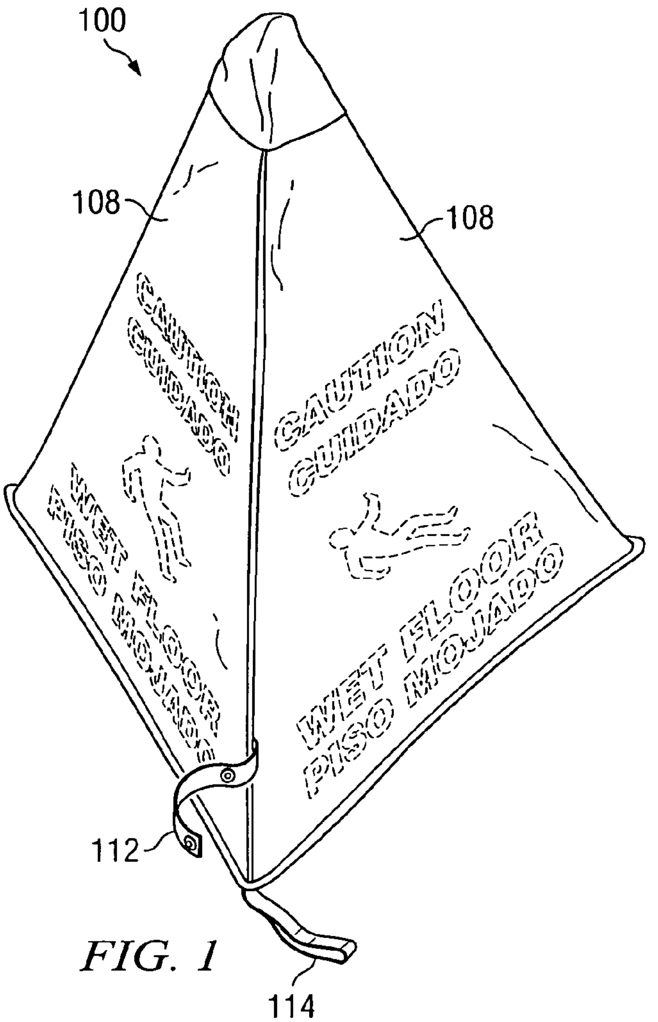
FIG. 1 is a perspective view of an improved portable and collapsible information sign device according to one embodiment of the present disclosure.
Figure 2:
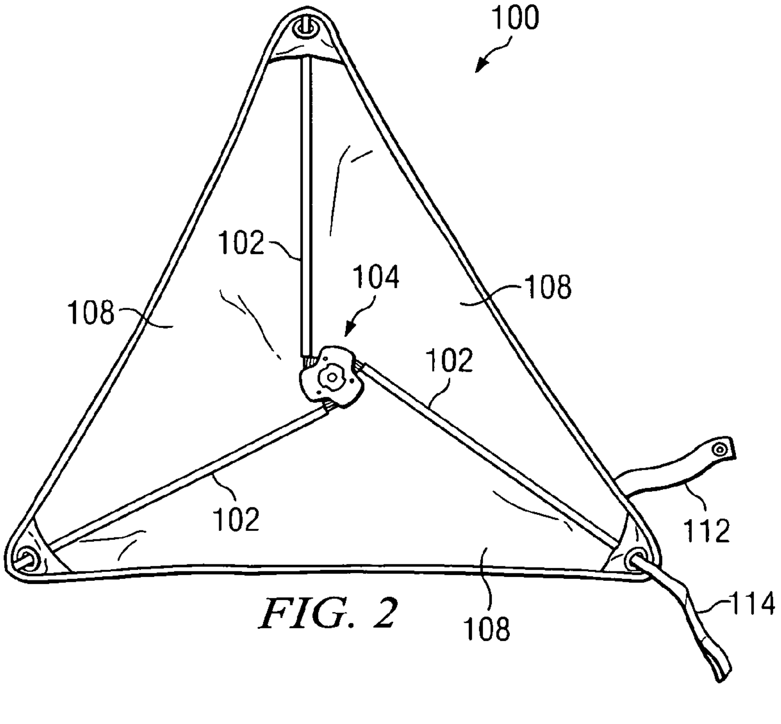
FIG. 2 is a perspective view of an improved portable and collapsible information sign device according to one embodiment of the present disclosure.

FIG. 1 is a perspective view, and FIG. 2 is a bottom view, of an improved portable and collapsible information sign device according to one embodiment of the present disclosure. Sign 100 forms a three sided pyramid that in the exemplary embodiment has a height of about 12 to 18 inches, preferably about 18inches, and a width along one edge of the base of about 12 to 18 inches, preferably about 16 inches. Sign 100 includes a collapsible frame formed by three legs 102 biased towards a deployed position by biasing mechanism 104 at one end thereof. The opposite end of each leg 102 includes a tip 106, with the sign 100 designed to rest on the ends of the tips 106 of all three legs 102 when deployed. A flexible plastic, canvas or fabric covering 108 covers the three legs from the biasing mechanism 104 along a length of the legs 102. The covering 108 bears a warning or alert message for warning signs, although other (e.g., advisory or informational) messages are possible. A separate covering may be employed for the top of sign 100, over the biasing mechanism 104.

Covering 108 is affixed to an exterior of the biasing mechanism 104 by adhesive or other suitable means. A bottom periphery of covering 108 includes trim having grommets 110 therein for receiving the tips 106 at the ends of legs 102. Tips 106 include a disk-shaped base (not visible in FIG. 2) that allows a portion of tips 106 to extend through the grommets while keeping covering 108 under tension between the ends of the legs 102 and the biasing mechanism 104.

Shown in the deployed position in FIGS. 1 and 2, in the collapsed position of sign 100 the legs 102 are rotated inward against the biasing force to a position in which the angles between the legs are substantially smaller, such that the legs are somewhat parallel to each other. A band 112 with a snap (or Velcro or similar fastening mechanism) may be provided to wrap around the legs 102 to maintain sign 100 in the collapsed position. A loop 114 for hanging the sign may also be provided.

Figure 3:
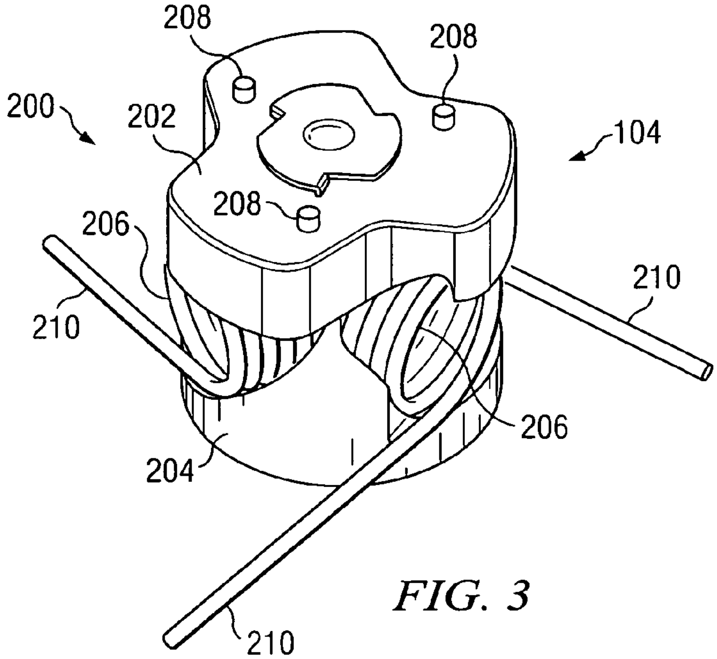
FIG. 3 is a perspective view of a biasing mechanism within an improved portable and collapsible information sign device according to one embodiment of the present disclosure.
Figure 4:
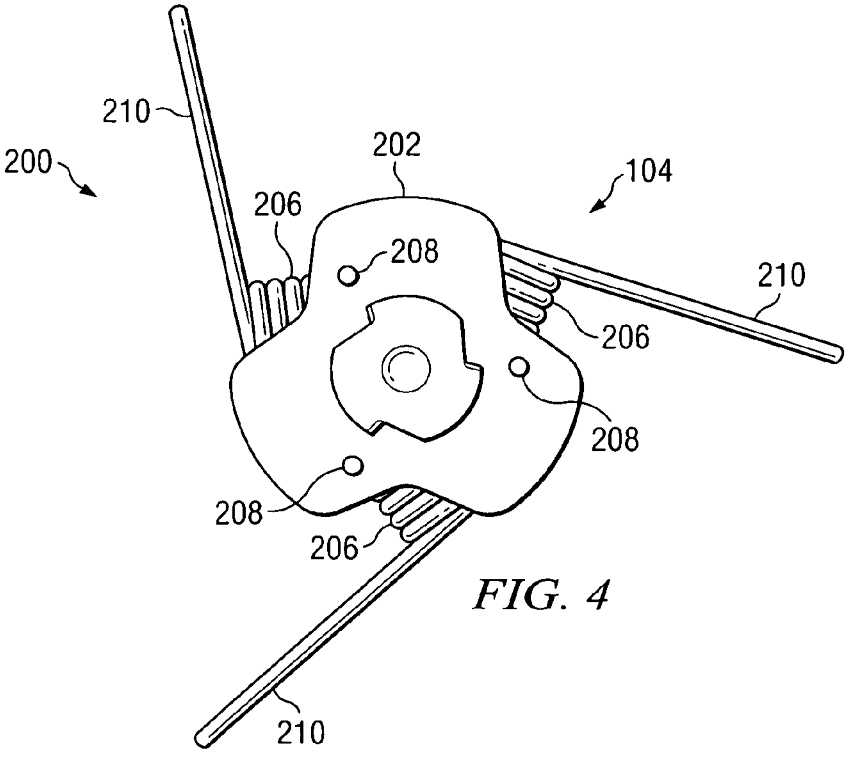
FIG. 4 is a top or plan view of a biasing mechanism within an improved portable and collapsible information sign device according to one embodiment of the present disclosure.
Figure 5:
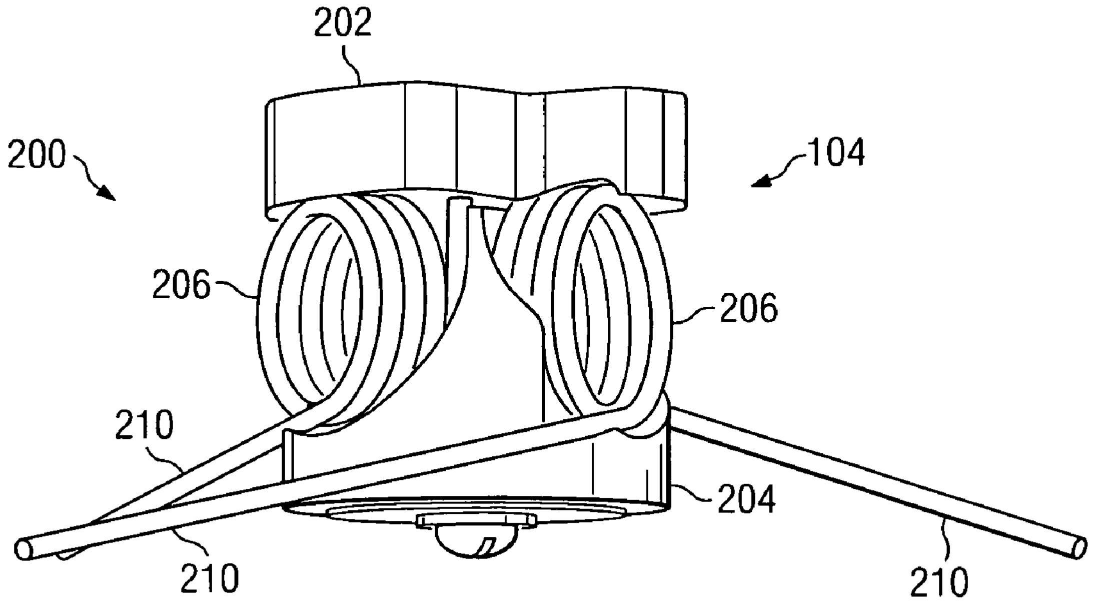
FIG. 5 is a side elevation view of a biasing mechanism within an improved portable and collapsible information sign device according to one embodiment of the present disclosure.

FIG. 3 is a perspective view, FIG. 4 is a top or plan view, and FIG. 5 is a side elevation view of a biasing mechanism within an improved portable and collapsible information sign device according to one embodiment of the present disclosure. Biasing mechanism 104 includes a spring support 200 of molded, hardened rubber or plastic, in an upper piece 202 and a lower piece 204 held together by a bolt, locking washer and flanged nut in the exemplary embodiment. Support 200 securely holds three biasing springs 206, one for each leg 102, in position. Each biasing spring 206 is oriented with the annulus formed by the spring coil extending outward from a center (longitudinal) axis of the support 200 and the coils oriented tangentially to a perimeter of the support 200.

Each biasing spring 206 includes one extension 208 oriented substantially parallel to a center (longitudinal) axis of support 200 and protruding through the upper piece 202 of support 200, as well a second, longer extension 210 each received within the hollow body of one of the tubular legs 102. Each extension 210 may be freely movable within the body of a leg 102, or alternatively may be secured therein or secured to the exterior of the leg 102 along a length thereof. When the sign is in the deployed position, extensions 210 are at a marked angle to the center axis of support 200. When the sign is in the collapsed position, the extensions (and the legs 102) are somewhat parallel to each other and to the center axis of support 200. The biasing force thus results from expansion or tension on the spring coils rather than contract or compression (that is, the extensions force the coils to enlarge rather than contract when the sign's legs 102 are move from the deployed position to the collapsed position).

In the exemplary embodiment, each spring has coils with four windings approximately 1 inch in diameter, with extension 208 approximately 1 inch long and extension 210 approximately 3.5 inches long. The upper portion 202 of support 200 has a trefoil maximum radius of about 1 inch and a minimum radius of less than 0.75 inches, with a thickness of about 0.5 inches. The bottom portion 204 of support 200 has a radius of about 1 inch and a height of 1.0 to 1.25 inches. Upper and lower portions 202 and 204 of support 200 have recessed regions adapted to securely hold the springs 206 in position between the upper and lower portions 202 and 204, with a lip on upper portion 202 extending over an outer edge of a top of each spring 206 while the extensions 210 project down outside the outer edge of the generally frustum-shaped bottom portion 204.

With biasing mechanism 104, legs 102 are not subjected to conflicting forces, such as when extensions from two different springs apply biasing force in different directions on a single leg. Accordingly, legs 102, which may be made of simple rigid plastic, are less likely to split with biasing mechanism 104 that with other biasing schemes such as those described above. In addition, springs 206 have less force to overcome (since they are not counter-acting each other) and may therefore be smaller, and are less likely to fail due to fatigue. By anchoring each spring within support 200 and causing the biasing forces to be relative to support 200, uniform biasing forces are applied to the legs 102 and less likelihood exists of shifting by the springs 206 to result in uneven biasing forces.

It should be noted that the orientation of springs 206 does not result in biasing force on legs 102 by extensions 210 in a direction radially outward from a center axis of support 200, but instead at a substantially tangential angle. Allowing such biasing force still achieves deployment of the respective sign leg but simplifies mounting of springs 206 within block 200, since no channels need be cut into block 200 to allow for movement of extensions 210. Simple annular recesses may be formed within support 200 for receiving the coils of springs 206, with extensions 210 extending outside the support 200. Upper piece 202 may have a lip protruding down over springs 206 to help retain the springs securely in position.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A portable sign comprising: three legs moveable between a deployed position and a collapsed position; a flexible covering over the three legs, the flexible covering bearing one or more of graphics, text or both; and a biasing mechanism urging each of the three legs from the collapsed position to the deployed position, the biasing mechanism including a support, formed by a trefoil-shaped upper portion and a frustrum-shaped lower portion, for securely retaining at least three coil springs between the upper and lower portions, said upper and lower portions having recesses therein each adapted to receive a portion of a spring, and wherein each of said at least three springs is mounted within the support with an annulus formed by the coils extending outwardly from a center of the support, wherein each coil spring terminates with a first extension secured by the support and a second extension applying a biasing force to one of the legs, and wherein the second extension of each of the springs is movable within a plane tangential to a perimeter of the support and applies a biasing force on one of the legs urging movement within the respective plane.

2. The portable sign of claim 1, wherein the first extension of each spring is secured within the upper portion of the support.

3. The portable sign of claim 1, wherein the second extension of each spring is received by a hollow portion of one of the legs.

* * * * *